United States Patent
Im

(10) Patent No.: US 8,511,879 B2
(45) Date of Patent: Aug. 20, 2013

(54) LIGHT EMITTING APPARATUS AND DISPLAY APPARATUS HAVING THE SAME

(75) Inventor: Hyung Suk Im, Gwangju-si (KR)

(73) Assignee: LG Innotek Co., Ltd., Seoul (KR)

( * ) Notice: Subject to any disclaimer, the term of this patent is extended or adjusted under 35 U.S.C. 154(b) by 619 days.

(21) Appl. No.: 12/594,465

(22) PCT Filed: Mar. 26, 2008

(86) PCT No.: PCT/KR2008/001677
§ 371 (c)(1),
(2), (4) Date: Jul. 2, 2010

(87) PCT Pub. No.: WO2008/120891
PCT Pub. Date: Oct. 9, 2008

(65) Prior Publication Data
US 2010/0290247 A1   Nov. 18, 2010

(30) Foreign Application Priority Data
Apr. 3, 2007 (KR) .................. 10-2007-0032659

(51) Int. Cl.
*F21V 7/04* (2006.01)
*F21V 7/05* (2006.01)
(52) U.S. Cl.
USPC ........................................ 362/609; 349/65

(58) Field of Classification Search
USPC .................................... 362/609; 349/65
See application file for complete search history.

(56) References Cited

U.S. PATENT DOCUMENTS

| 6,412,969 | B1 * | 7/2002 | Torihara et al. ............. 362/609 |
| 7,033,059 | B2 | 4/2006 | Yang et al. |
| 7,139,048 | B2 | 11/2006 | Han et al. |
| 2005/0001952 | A1 * | 1/2005 | Han et al. ................... 349/65 |
| 2006/0208268 | A1 * | 9/2006 | Ueno et al. .................. 257/98 |
| 2007/0127261 | A1 * | 6/2007 | An et al. ..................... 362/608 |
| 2007/0228947 | A1 * | 10/2007 | Tanimoto et al. ........... 313/506 |

FOREIGN PATENT DOCUMENTS

| KR | 10-2005-0005353 A | 1/2005 |
| KR | 20-0372781 Y1 | 1/2005 |
| KR | 10-2007-0010431 A | 1/2007 |
| KR | 10-2007-0032710 A | 3/2007 |

* cited by examiner

*Primary Examiner* — Karabi Guharay
*Assistant Examiner* — Nathaniel Lee
(74) *Attorney, Agent, or Firm* — Birch, Stewart, Kolasch & Birch, LLP

(57) ABSTRACT

Disclosed are a light emitting apparatus and a display apparatus having the same. The light emitting apparatus comprises a light guide plate comprising a groove in a side surface thereof, and a light emitting diode unit, in which at least a portion of the light emitting device unit is inserted into the groove of the light guide plate.

19 Claims, 2 Drawing Sheets

LIGHT EMITTING APPARATUS AND DISPLAY APPARATUS HAVING THE SAME

TECHNICAL FIELD

The embodiment relates to a light emitting apparatus and a display apparatus having the same.

BACKGROUND ART

Display devices include a cathode ray tube (CRT), a liquid crystal display (LCD) using an electro-optic effect, a plasma display panel (PDP) using a gas-discharge, and an electro luminescence display (ELD) using an electro-luminescence effect. Among them, studies and researches on the LCD have been actively performed.

Since the LCD is advantageous in terms of miniaturization, weight, low power consumption, full color implementation and the like, the LCD can overcome the disadvantages of a CRT. Accordingly, the LCD has been widely used for various fields.

Since such an LCD is a light receiving device that displays an image by controlling the amount of a light from the outside, the LCD requires an additional external light source such as a backlight unit.

DISCLOSURE OF INVENTION

Technical Problem

The embodiment provides a light emitting apparatus and a display apparatus having the same, in which at least a portion of a light emitting diode unit is inserted into a light guide plate.

The embodiment provides a light emitting apparatus and a display apparatus, capable of reducing light loss between a light emitting diode and a light guide plate.

Technical Solution

An embodiment provides a light emitting apparatus comprising: a light guide plate comprising a groove in a side surface thereof, and a light emitting diode unit, in which at least a portion of the light emitting device unit is inserted into the groove of the light guide plate.

An embodiment provides a light emitting apparatus comprising: a light guide plate comprising a groove formed in a side surface thereof, and a light emitting device inserted into the groove of the light guide plate.

An embodiment provides a display apparatus comprising: a light guide plate comprising a groove formed in a side surface thereof, a light emitting device unit, in which at least a portion of the light emitting diode unit is inserted into the groove of the light guide plate, an optical sheet on the light guide plate, and a display panel on the optical sheet.

Advantageous Effects

According to the embodiments, light loss can be reduced in a light guide plate.

According to the embodiments, a dark area existing in the light guide plate can be decreased, and a light emitting area in the light guide plate can be increased.

According to the embodiments, an LED unit having a bar shape is partially inserted into a side surface of the light guide plate, thereby simplifying the manufacturing process of a light unit.

BEST MODE FOR CARRYING OUT THE INVENTION

Hereinafter, embodiments will be described with reference to accompanying drawings.

Figure 1:
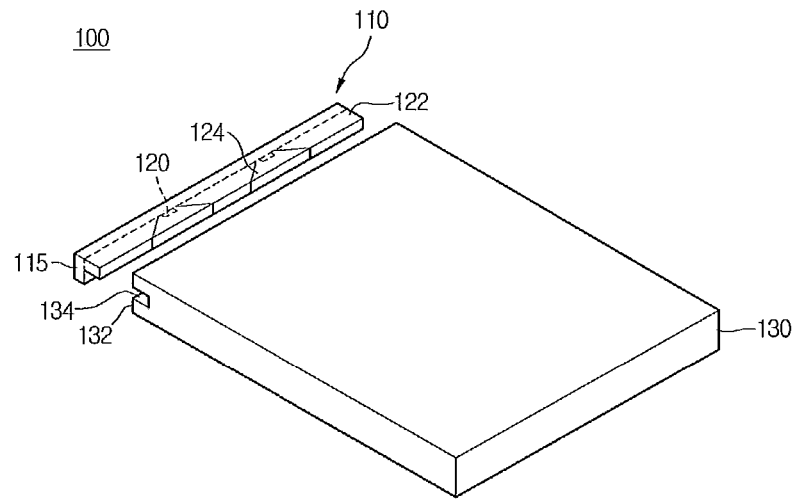
FIG. 1 is a perspective view showing a light emitting apparatus according to a first embodiment.

FIG. 1 is a perspective view showing a light emitting apparatus according to a first embodiment.

Referring to FIG. 1, the light emitting apparatus 100 comprises a light emitting diode (LED) unit 110 and a light guide plate (LGP) 130.

The LED unit 110 is provided at least one side of the LGP 130 to emit light emitted from an LED 120.

Such an LED unit 110 may have a predetermined bar shape, and includes at least one LED 120. In this case, a plurality of the LEDs 120 may be provided according to the size of the LGP 130. The plural LEDs 120 may be provided by a predetermined interval.

The LED unit 110 comprises a substrate 115, the LED 120, and a reflector 122.

The reflector 122 protrudes from a portion of a top layer of the substrate 115, and is formed with a cavity 124 having a predetermined depth. A surface of the cavity 24 may have a circular or a polygonal sectional shape.

Such a reflector 122 is prepared on a substrate 115 in the form of poly phthal amid (PPA) resin or silicon (e.g., a wafer level package). The reflector 122 may have a shape corresponding to the groove 134 of the LGP 130.

The cavity 124 is provided therein with at least one LED 120. The cavity 124 may be formed therein with a resin member (not shown), and the resin member includes a transparent epoxy material or a silicon material. The surface of the resin member (not shown) may have a shape identical to a shape (for example, flat shape) of the front surface of the reflector 122. Such a resin member (not shown) may have various surfaces according to the groove 134 of the LGP 130. For example, the resin member (not shown) may have a surface of a concave lens shape or a convex lens shape.

The LGP 130 comprises a plastic material such as poly methyl methcrylate (PMMA), polycarbonate (PC), or poly ethylene terephthalate (PET). The LGP 130 may have on the bottom surface or on the top/bottom surface with a reflective pattern that reflects an incident light.

One side surface 132 of the LGP 130 has a convex-concave configuration, and the groove 134 is formed at the horizontal center portion of the side surface 132. Such a groove 134 has a shape the same as the external profile of the reflector 122.

The groove 134 is formed on at least one side surface 132 of the LGP 130. At least a portion of the LED unit 110 may be inserted into the groove 134. For example, the reflector 122 may be inserted into the groove 134. In addition, the LGP 130 may be formed on two side surfaces thereof with grooves. When the LGP 130 is employed for a large-size structure such as a computer, LED units are provided on two side surfaces of the LGP 130 such that a light can be incident into the grooves of the LGP 130.

If the reflector 122 of the LED unit 110 is inserted into the groove 134 of the LGP 130, the light emitted from the LED 120 in the cavity 124 is emitted as a surface light source through the bottom surface or the top/bottom surface of the LGP 130 after the light has been incident into the groove 134, and then guided to the whole area of the LGP 130.

Figure 2:
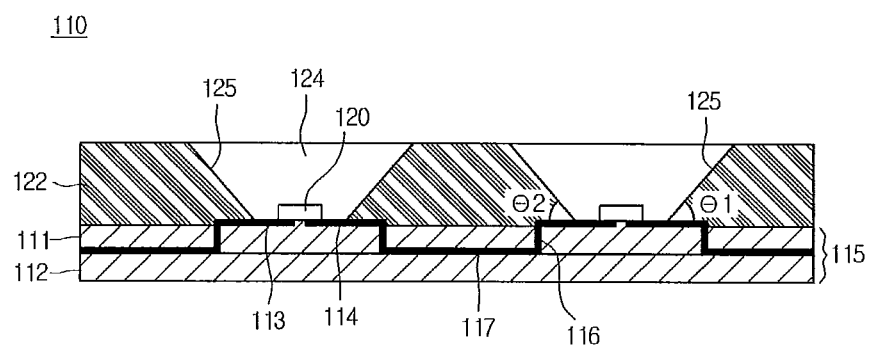
FIG. 2 is a side sectional view showing a light emitting diode unit of FIG. 1.

FIG. 2 is a sectional view showing the LED unit of FIG. 1.

Referring to FIG. 2, the substrate 115 comprises a BT-resin or FR-4 (FLAME RETARDANT-4) substrate, a metal substrate (e.g., metal core PCB; MCPCB), or a semiconductor substrate (including GaN, GaAs, or Si). The substrate 115 may include a flexible substrate.

Such a substrate 115 may have a single layer or multiple layers. When multiple layers 111 and 112 are employed for the substrate 115, predetermined patterns 113, 114, and 117 may be formed on each layer, and the layers may be connected to each other through a via hole 116, a through hole, or a via. The substrate 115 may be connected to a main substrate or a driver.

The electrode patterns 113 and 114 are formed on the top layer of the substrate 115, and portions of the electrode patterns 113 and 114 are exposed by the cavity 124. The LED 120 may be installed on the electrode patterns 113 and 114 of the cavity 124 in the form of a chip or a package.

The LED 120 may be bonded on the electrode patterns 113 and 114 through one of a flip bonding scheme, a wire bonding scheme, or a die bonding scheme. However, the embodiment is not limited to the bonding schemes or the connection structure.

Such an LED 120 comprises at least one of a red LED chip, a green LED chip, a blue LED chip, UV LED chip, and yellow LED chip. The number or the color of such LED chips may be changed.

At least one LED chip can be provided in the cavities 124 of the reflector 122, and at least one of a red light, a green light, a blue light, and a white light can be emitted from the cavity 124. For example, a white light may be emitted by mixing lights of three color LED chips (red/green/blue LED chips), or red, green, and blue lights may be emitted by individually driving the LED chips according to colors. The number or the type of such LED chips may be changed.

In addition, a resin member (not shown) is formed in the cavity 124 in order to protect the LED 120. The resin member (not shown) may include a transparent epoxy material or a silicon material. The resin member (not shown) may include a phosphor if necessary.

Side surfaces 125 of the cavity 124 may be inclined. The cavity 124 may have the side surfaces 125 inclined at inclination angles θ1 and θ2 in the range of 25° to 85° with respect to the bottom surface (or a substrate surface). The exterior angle θ1 of one side surface of the cavity 124 is equal to or greater than the exterior angle θ2 of the other side surface of the cavity 124. The angles θ1 and θ2 may be changed according to the intervals between the cavities 124 and the material of the reflector 122, and the embodiment is not limited thereto. A reflective material such as Ag or Al may be coated on the side surfaces 125 of the cavity 124 in order to enhance the reflective efficiency.

Figure 3:
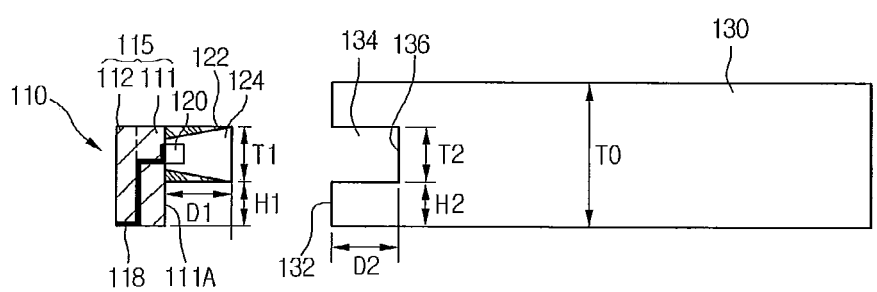
FIG. 3 is an explored sectional view of a light emitting apparatus according to the first embodiment.
Figure 4:
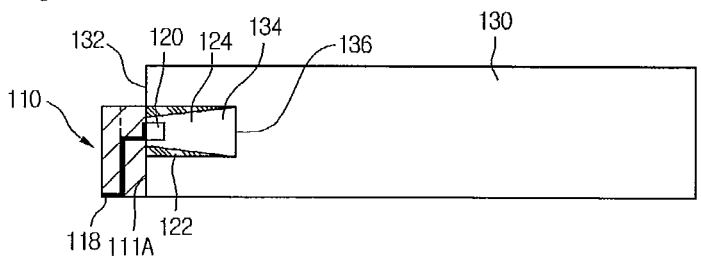
FIG. 4 is an assembled sectional view of a light emitting apparatus according to the first embodiment.

FIG. 3 is an exploded sectional view of the light emitting apparatus according to the first embodiment. FIG. 4 is an assembled view showing the light emitting apparatus of FIG. 3.

Referring to FIGS. 3 and 4, the length D1 of the reflector 122 corresponds to a distance from a top layer 111A of the substrate 115 to the front surface of the reflector 122. In addition, the length D1 of the reflector 122 may be identical to or different from the depth D2 of the groove 134 of the LGP 130. The D1 and D2 may have a length in the range of 1 mm to 1.5 mm.

The thickness T1 of the reflector 122 may be identical to or thinner than the thickness T2 of the groove 134 of the LGP 130. The thickness T2 of the groove 134 may correspond to about 40% to about 60% of the thickness T0 of the LGP 130. For example, if the thickness T0 is 1 mm, the thickness T2 is in the range of about 0.4 mm to about 0.6 mm. The thickness T1 of the reflector 122 is in the range of about 0.4 mm to about 0.6 mm or thinner than about 0.4 mm.

The reflector 122 is spaced apart from the bottom surface of the substrate 115 by a predetermined distance H1, and the distance H1 may be identical to or different from the thickness H2 of a lower portion of the side surface of the LGP 130.

The reflector 122 of the LED unit 110 is inserted into the groove 134 of the LGP 130 while making surface-contact with the groove 134. At this time, the front surfaces of the reflector 122 and the cavity 124 stick to an inner surface 136 of the groove 134 of the LGP 130. Such the inner surface 136 of the groove 134 may serve as a light incident surface of the LGP 130.

At the lower portion of the substrate 115, an electrode 118 may be exposed, or connected to the driver through a connection substrate.

In addition, the top layer 111A of the lower portion of the substrate 115 may make contact with a lower portion of one side surface of the LGP 130. Accordingly, the groove 134 of the LGP 130 stably supports the reflector 122 of the LED unit 110.

Since a light is incident onto the inner surface 136 of the groove 134 of the LGP 130, it is possible to reduce the loss of a light incident onto the LGP 130 from the LED 120.

Figure 5:
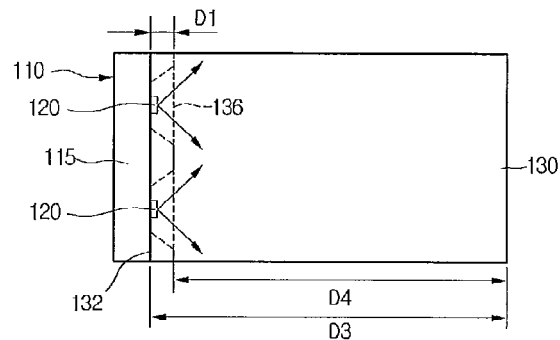
FIG. 5 is a plan view showing a light emitting apparatus according to the first embodiment.

FIG. 5 is a plan view showing the light emitting apparatus according to the first embodiment.

Referring to FIG. 5, the LED 120 and the reflector 122 of the LED unit 110 are inserted into the groove 134 of the LGP 130. Accordingly, there is no gap between the LED 120 and the LGP 130, and the light emitted from the LED 120 can be incident onto the LGP 130 without loss.

In addition, the LED 120 or the reflector 122 is inserted into the groove 134 of the LGP 130, thereby increasing the length (D3=D1+D4) of the LGP 130 or the area of a surface light source.

Since the LED 120 is inserted into the LGP 130, the dark area of the LGP 130 may be reduced, and a light emitting area of the LGP 130 can be increased.

The bottom surface of the reflector 122 may be bonded to the groove 134 of the LGP 130 by using an adhesive. In addition, the reflector 122 may be press-fitted into the groove 134 of the LGP 130.

Figure 6:
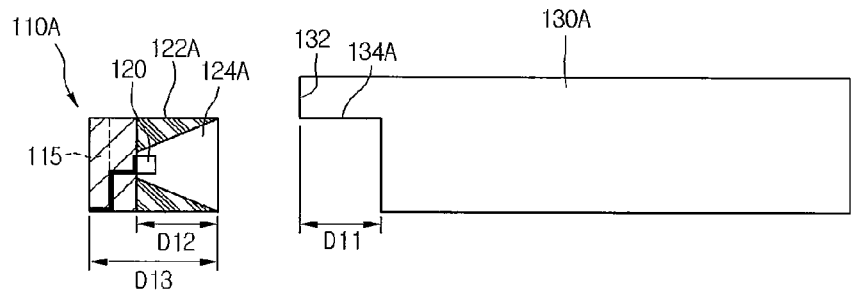
FIG. 6 is a sectional view showing a light emitting apparatus according to a second embodiment.

FIG. 6 is a sectional view showing a light emitting apparatus according to a second embodiment.

Referring to FIG. 6, a LED unit 110A has a square column shape, and a reflector 122A is formed on a top layer of a substrate 115. An LGP 130A is formed in one side surface 132 with a groove 134A formed by cutting away a lower portion of the side surface 132. The reflector 122A of the LED unit 110A is inserted into the groove 134A of the LGP 130A. At this time, a front portion of a cavity 124A of the reflector 122A makes contact with an inner surface of the groove 134A.

In this case, the depth D11 of the groove 134A may be identical to the depth D12 of the reflector 122A, or the depth D13 of the LED unit 110A.

Figure 7:
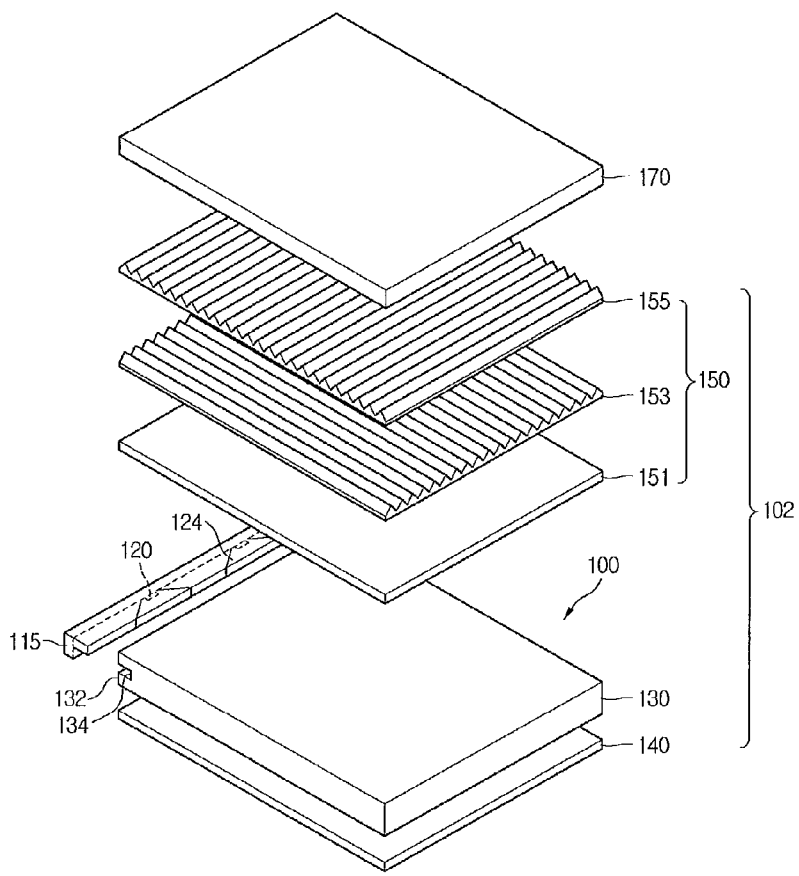
FIG. 7 is a perspective view showing a display apparatus employing the light emitting apparatus according to the first embodiment.

FIG. 7 is a perspective view showing a display apparatus 200 employing the light emitting apparatus 100 according to the first embodiment.

Referring to FIG. 7, the display apparatus 200 comprises a display panel 170 and a light unit 102 having the light emitting apparatus 100.

The light unit 102 includes the light emitting apparatus 100, a reflective plate 140, and an optical sheet 150. A portion of components of the light unit 102 may be received in a mold frame, a chassis structure, or a metal bottom cover, which are not shown in drawings.

The light emitting apparatus 100 includes the LED unit 110 having a bar shape and the LGP 130. A component of the LED unit 110, for example, the reflector 122 is inserted into the groove 134 formed in the side surface 132 of the LGP 130.

The LED 120 emits a light into the groove 134 of the LGP 130, and the LGP 130 emits the incident light as a surface light source after guiding the incident light to the whole area. In this case, the LGP 130 may be formed on a predetermined surface thereof with a reflective pattern (not shown), and a light reflected from the reflective pattern is irradiated in the form of a surface light source.

The light emitted from the LGP 130 is irradiated to the display panel 170 through the optical sheet 150.

The optical sheet 150 comprises at least one of a diffusion sheet 151, a horizontal prism sheet 153, and a vertical prism sheet 155. The diffusion sheet 151 is provided over the LGP 130 and diffuses the incident light. The horizontal and vertical prism sheets 153 and 155 are provided over the diffusion sheet 151, and the diffused light is gathered onto the display area.

The reflective plate 140 is provided under the LGP 130 to reflect a light that is leaked downward from the LGP 130. Such a reflective plate 140 is not necessary to extend to the bottom of the substrate because a part of the LED unit 110 is inserted into the LGP 130.

The display panel 170 serves as a liquid panel, and includes two transparent substrates (not shown) and liquid crystal (not shown). The display panel 170 can display information by using a transmitted light and the driving of the liquid crystal. The embodiment is not limited to the display panel 170, and the display panel 170 may be modified or changed.

In addition, the light emitting apparatus 100 may be used in a dual display apparatus. For example, display panels are provided at both sides of the LGP 130, and the surface light source of the LGP 130 can be emitted bi-directionally.

The light emitting apparatus 100 or the display apparatus 200 is adaptable for a cellular phone, a portable terminal such as a PMP, or a computer.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

According to the embodiments, light loss can be reduced in an LGP.

According to the embodiments, a dark area existing in the LGP can be decreased, and the light emitting of the LGP area can be increased.

According to the embodiments, the LED unit having a bar shape is partially inserted into the side surface of the LGP, thereby simplifying the manufacturing process of a light unit.

The invention claimed is

1. A light emitting apparatus comprising:
  a light guide plate comprising a groove in an entire side surface thereof; and
  a light emitting device unit comprising a substrate, a light emitting diode, and a reflector having a cavity,
  wherein the substrate has an electrode pattern electrically connected to the light emitting diode, the light emitting diode is provided in the cavity, a thickness of the reflector corresponds to a thickness of the groove, and at least a portion of the light emitting device unit is inserted into the groove of the light guide plate,
  wherein at least two light emitting devices are inserted into the groove of the light guide plate,
  wherein first and second side surfaces of the cavity are inclined with respect to a top surface of the substrate, and
  wherein an angle between the first side surface of the cavity and the top surface of the substrate is different from an angle between the second side surface of the cavity and the top surface of the substrate.

2. The light emitting apparatus as claimed in claim 1, wherein the light guide plate comprises a reflective pattern formed at least one of top and bottom surfaces of the light guide plate.

3. The light emitting apparatus as claimed in claim 1, wherein the groove of the light guide plate comprises a concave shape or a recess shape at a horizontal center portion or a lower portion of the side surface of the light guide plate.

4. The light emitting apparatus as claimed in claim 3, comprising the reflector formed on a portion of a top layer of the substrate, wherein the reflector has a size corresponding to a size of the groove of the light guide plate.

5. The light emitting apparatus as claimed in claim 1, wherein the cavity comprises a transparent resin member or a resin member comprising a phosphor.

6. The light emitting apparatus as claimed in claim 1, wherein the groove of the light guide plate comprises a shape corresponding to an external profile of the reflector.

7. The light emitting apparatus as claimed in claim 1, wherein the light guide plate comprises grooves formed in a plurality of side surfaces thereof, and the light emitting apparatus comprises a plurality of light emitting device units, in which at least a portion of the light emitting device units is inserted into the grooves of the light guide plate.

8. The light emitting apparatus as claimed in claim 1, wherein the groove of the light guide plate comprises a thickness corresponding to 40% to 60% of a thickness of the light guide plate.

9. The light emitting apparatus as claimed in claim 1, wherein the groove of the light guide plate comprises a depth in a range of 1 mm to 1.5 mm.

10. The light emitting apparatus as claimed in claim 1, wherein the light emitting device unit comprises at least one of a red light emitting device, a green light emitting device, a blue light emitting device, and a white light emitting device.

11. The light emitting apparatus as claimed in claim 1, comprising an optical sheet on the light guide plate.

12. The light emitting apparatus as claimed in claim 1, comprising a reflective plate under the light guide plate.

13. The light emitting apparatus as claimed in claim 1, wherein the substrate includes a first layer having a first electrode pattern and a second layer having a second electrode pattern, and wherein the first electrode pattern and the second electrode pattern are connected to each other through a via hole formed between the first layer and the second layer.

14. A light emitting apparatus comprising:

a light guide plate comprising a groove formed in an entire side surface thereof; and a light emitting device unit comprising a substrate, a plurality of light emitting diodes, and a reflector having a plurality of cavities, wherein the substrate has an electrode pattern electrically connected to the plurality of light emitting diodes, the plurality of light emitting diodes is provided in the plurality of cavities, a thickness of the reflector corresponds to a thickness of the groove, and at least a portion of the light emitting device unit is inserted into the groove of the light guide plate, wherein at least two light emitting devices are inserted into the groove of the light guide plate, wherein first and second side surfaces of one of the plurality of cavities are inclined with respect to a top surface of the substrate, and wherein an angle between the first side surface of the cavity and the top surface of the substrate is different from an angle between the second side surface of the cavity and the top surface of the substrate.

15. The light emitting apparatus as claimed in claim 14, wherein the reflector is provided for making contact with an inside of the groove.

16. The light emitting apparatus as claimed in claim 14, wherein adjacent cavities of the reflector are spaced apart from each other by a predetermined interval.

17. The light emitting apparatus as claimed in claim 14, wherein a light is incident onto an inside of the groove of the light guide plate.

18. A display apparatus comprising:

a light guide plate comprising a groove formed in an entire side surface thereof;

a light emitting device unit comprising a substrate, a light emitting diode, and a reflector having a cavity;

an optical sheet on the light guide plate; and a display panel on the optical sheet, wherein the substrate has an electrode pattern electrically connected to the light emitting diode, the light emitting diode is provided in the cavity, a thickness of the reflector corresponds to a thickness of the groove, and at least a portion of the light emitting device unit is inserted into the groove of the light guide plate, wherein at least two light emitting devices are inserted into the groove of the light guide plate, wherein first and second side surfaces of the cavity are inclined with respect to a top surface of the substrate, and wherein an angle between the first side surface of the cavity and the top surface of the substrate is different from an angle between the second side surface of the cavity and the top surface of the substrate.

19. The display apparatus as clamed in claim 18, comprising a reflective plate under the light guide plate.

* * * * *